(12) United States Patent
Kim et al.

(10) Patent No.: US 9,297,946 B2
(45) Date of Patent: Mar. 29, 2016

(54) DISPLAY DEVICE AND METHOD OF MANUFACTURING THE SAME

(71) Applicant: SAMSUNG DISPLAY CO., LTD., Yonging, Gyeonggi-Do (KR)

(72) Inventors: Hyoung-Joo Kim, Anyang-si (KR); Sung-Kyu Shim, Seoul (KR); Seok Hyun Nam, Seoul (KR); Jin Sung Choi, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 143 days.

(21) Appl. No.: 13/911,556

(22) Filed: Jun. 6, 2013

(65) Prior Publication Data
US 2014/0185316 A1 Jul. 3, 2014

(30) Foreign Application Priority Data

Dec. 31, 2012 (KR) ........................ 10-2012-0158589

(51) Int. Cl.
| | |
|---|---|
| F21V 9/16 | (2006.01) |
| F21V 8/00 | (2006.01) |
| B82Y 20/00 | (2011.01) |
| B82Y 30/00 | (2011.01) |

(52) U.S. Cl.
CPC ............ G02B 6/0021 (2013.01); G02B 6/0023 (2013.01); G02B 6/0065 (2013.01); B82Y 20/00 (2013.01); B82Y 30/00 (2013.01); G02B 6/0031 (2013.01); Y10T 29/49002 (2015.01)

(58) Field of Classification Search
CPC .. G02B 6/0003; G02B 6/0011; G02B 6/0018; G02B 6/0021; G02B 6/0023; G02B 6/0026; G02B 6/0031; G02B 6/0051; G02B 6/0055
USPC .......... 362/84, 240, 245, 246, 247, 623, 624, 362/627
See application file for complete search history.

(56) References Cited

U.S. PATENT DOCUMENTS

| | | | |
|---|---|---|---|
| 6,498,631 B2 * | 12/2002 | Natsuyama | ...................... 349/65 |
| 6,613,610 B2 | 9/2003 | Iwafuchi et al. | |
| 7,220,608 B2 | 5/2007 | Oohata | |
| 7,585,083 B2 * | 9/2009 | Kim et al. | ...................... 362/330 |
| 7,679,827 B2 | 3/2010 | Park et al. | |
| 2004/0130515 A1 * | 7/2004 | Chuang et al. | .................. 345/82 |

(Continued)

FOREIGN PATENT DOCUMENTS

| | | |
|---|---|---|
| JP | 2006-184872 | 7/2006 |
| JP | 2009-237290 | 10/2009 |

(Continued)

Primary Examiner — Y M Lee
(74) Attorney, Agent, or Firm — F. Chau & Associates, LLC

(57) ABSTRACT

A display device according to an embodiment of the invention includes a display member configured to display images, a light source member configured to generate light, and a light guiding member disposed between the light source member and the display member. The light guiding member is configured to guide the light to the display member. The display member, the light source member, and the light guiding member are integrated as a single unit. The light source member generates blue light. The light guiding member includes a light guide layer and a fluorescent layer disposed on a top surface or a bottom surface of the light guide layer. The fluorescent layer is configured to convert the blue light into white light.

13 Claims, 8 Drawing Sheets

(56) References Cited

U.S. PATENT DOCUMENTS

| | | | |
|---|---|---|---|
| 2004/0223315 A1* | 11/2004 | Suehiro et al. | 362/84 |
| 2006/0061537 A1* | 3/2006 | Yu et al. | 345/102 |
| 2006/0268568 A1 | 11/2006 | Oku et al. | |
| 2007/0019410 A1 | 1/2007 | Kim et al. | |
| 2007/0030676 A1* | 2/2007 | Ichihara | 362/240 |
| 2009/0147179 A1* | 6/2009 | Yamashita et al. | 362/339 |
| 2010/0202157 A1 | 8/2010 | Jang et al. | |
| 2010/0246209 A1* | 9/2010 | Park et al. | 362/606 |
| 2010/0259164 A1 | 10/2010 | Oohata et al. | |
| 2010/0309407 A1* | 12/2010 | Shimura | 349/62 |
| 2011/0163334 A1 | 7/2011 | Krijn et al. | |
| 2011/0273864 A1* | 11/2011 | Izawa et al. | 362/84 |
| 2012/0307523 A1* | 12/2012 | Oya | 362/613 |

FOREIGN PATENT DOCUMENTS

| | | |
|---|---|---|
| KR | 1998-060839 | 10/1998 |
| KR | 10-2001-0016745 | 3/2001 |
| KR | 10-1002343 | 12/2010 |

* cited by examiner

DISPLAY DEVICE AND METHOD OF MANUFACTURING THE SAME

This U.S. non-provisional application claims priority under 35 U.S.C. §119 to Korean Patent Application No. 10-2012-0158589, filed on Dec. 31, 2012, in the Korean Intellectual Property Office, the disclosure of which is incorporated by reference herein in its entirety.

TECHNICAL FIELD

Exemplary embodiments of the invention relate to a display device and a method of manufacturing the display device.

DISCUSSION OF THE RELATED ART

Non-emissive display devices such as liquid crystal displays ("LCDs") may use ambient light or light emitted from a backlight unit.

Demand for more lightweight and compact displays is on the rise. However, the size of non-emissive displays may be limited by, e.g., the size of other components such as the backlighting unit.

SUMMARY

A display device according to an exemplary embodiment of the invention includes a display member configured to display images, a light source member configured to generate light, and a light guiding member disposed between the light source member and the display member. The light guiding member is configured to guide the light to the display member. The display member, the light source member, and the light guiding member are integrated as a single unit. The light source member generates blue light. The light guiding member includes a light guide layer and a fluorescent layer disposed on a top surface or a bottom surface of the light guide layer. The fluorescent layer is configured to convert the blue light into white light.

The light guide layer may have a plurality of depressions disposed on the bottom surface. The depressions may function as lenses.

The light guiding member may further include a diffusion layer disposed on the light guide layer.

The fluorescent layer may be coated on a surface of the depressions.

The fluorescent layer may be disposed on a top surface of the diffusion layer.

The fluorescent layer may include a quantum dot.

The light source member may include a light source chip disposed on the depressions.

The light source member may further include a circuit board and a reflective layer. On the circuit board is disposed the light source chip. A reflective layer is disposed on the light guide layer.

A display device according to an exemplary embodiment of the invention includes a display member, a light source member, and a light guiding member. The display member is configured to display images. The light source member is configured to generate light. The light source member is attached to a periphery of the display member. The light guiding member is disposed under the display member. The light guiding member is configured to guide the light to the display member.

The light guiding member may include a light guide layer, a diffusion layer disposed on the light guide layer, an adhesion layer disposed between the light guide layer and the diffusion layer, and a reflection layer disposed under the light guide layer.

The light guiding member may further include a reversed prism layer disposed between the diffusion layer and the adhesion layer.

The display member may include a first display panel and a second display panel combined with the first display panel. The first display panel may be larger than the second display panel. The light source member may be attached to the first display panel.

A method of manufacturing a display device according to an exemplary embodiment of the invention is provided. The method includes forming a plurality of first depressions on a first surface of a light guide layer. The light guide layer has a second surface disposed opposite to the first surface. Fluorescent layers are formed on the plurality of first depressions. A diffusion layer is disposed on the second surface of the light guide layer to form a light guiding member. The light guiding member includes the light guide layer, the fluorescent layers, and the diffusion layer. A light source member including a plurality of light source chips are aligned with the light guiding member such that the light source chips face the first depressions, respectively. The light guiding member is adhered to the light source member such that the light source chips are received in the first depressions, respectively. A display member is coupled with the light guiding member.

A plurality of second depressions having a shape and arrangement substantially the same as the plurality of first depressions of the light guide layer is formed on a pre-mold plate. A light curing resin is coated on the pre-mold plate. The light curing resin is cured to form a mold. The first depressions are formed on the light guide layer using the mold.

The mold may include a flexible material. The mold may be attached to an outer surface of a roll. The light guide layer is pressed with the roll.

According to an exemplary embodiment of the present invention, a display device includes a circuit board. A reflective layer is disposed on the circuit board. A plurality of light source chips is connected to the circuit board. The plurality of light source chips is arranged on the reflective layer and is spaced apart from each other at a predetermined distance. A light guide is disposed on the reflective layer. The light guide includes a plurality of depressions on a bottom surface thereof. The plurality of depressions are arranged to cover the plurality of light source chips, respectively. A display panel is disposed on the light guide. The circuit board, the reflective layer, the light guide, and the display panel are integrated as a single unit.

DETAILED DESCRIPTION OF EXEMPLARY EMBODIMENTS

Figure 1:
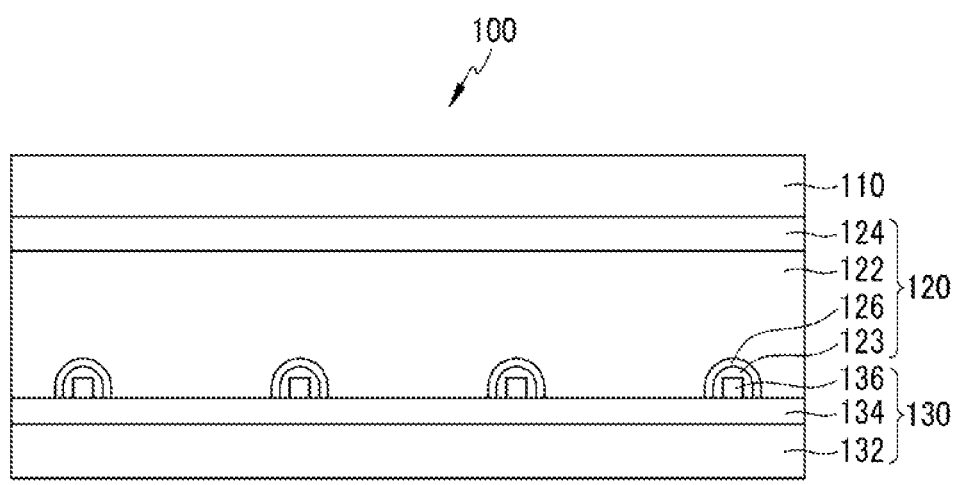
FIG. 1 is a sectional view of a display device according to an exemplary embodiment of the invention.

Exemplary embodiments of the present invention will be described in more detail hereinafter with reference to the accompanying drawings. As those skilled in the art would realize, the described embodiments may be modified in various different ways.

Like reference numerals may designate like or similar elements throughout the specification and the drawings. It will be understood that when an element is referred to as being "on," "connected to," or "coupled to" another element, it can be directly on, connected to or coupled to the other element or intervening elements may be present.

As used herein, the singular forms "a," "an," and "the" are intended to include the plural forms as well, unless the context clearly indicates otherwise.

FIG. 1 is a sectional view of a display device according to an embodiment of the invention.

Referring to FIG. 1, a display device 100 according to an exemplary embodiment of the invention includes a display member 110, a light guiding member 120, and a light source member 130, which are sequentially stacked. Each of the display member 110, the light guiding member 120, and the light source member 130 may have a shape of a (flat) panel or a film. The display member 110, the light guiding member 120, and the light source member 130 may be integrated as a single unit. The display member 110 displays images, the light source member 130 produces light, and the light guiding member 120 guides the light from the light source member 130 to the display member 110.

The display member 110 may include a non-emissive image flat panel display such as a liquid crystal display panel.

The light source member 130 includes a circuit board 132, a reflective layer 134, and a plurality of light source chips 136.

The circuit board 132 may include a plurality of circuit elements electrically connected to the light source chips 136. The circuit board 132 may be flexible. The circuit board 132 may be formed to a standardized size, for example, about 10.1 inches. Two or more circuit boards may be used.

Each of the light source chip 136 includes a light source generating light, and is disposed on the circuit board 132. The light source chips 136 may be arranged at a predetermined interval. For example, one light source chip 136 may be disposed per area of about 5 mm×about 5 mm. The light source chips 136 may be connected to the circuits of the circuit board 132. The light source chips 136 may include light emitting diode (LED) chips. The light source chips 136 may generate blue light. In other words, the light source chips 136 may be blue LED chips that may emit blue light.

The reflective layer 134 may be coated on the circuit board 132. The reflective layer 134 may include a reflective material.

The light guiding member 120 may include a light guide layer 122, a diffusion layer 124, and a plurality of fluorescent layers 126.

The light guide layer 122 may include a transparent or translucent insulator. A bottom surface of the light guide layer 122 has a plurality of substantially hemispheric depressions 123 that may be arranged in a predetermined interval. The depressions 123 are located at positions corresponding to the light source chips 136. The depressions 123 may function as lenses spreading light generated from the light source chips 136 in various directions. The bottom surface of the light guide layer 122 except for the depressions 123 may be attached to the reflective layer 134.

The fluorescent layers 126 are coated on surfaces of the respective depressions 123. The fluorescent layers 126 may convert blue light from the light source chips 136 into white light.

Although the light source chips 136 emitting blue light and the fluorescent layers 126 are used to generate white light, the exemplary embodiments of the present invention are not limited thereto. For example, light source chips 136 that may emit other colors of light may also be used, and the fluorescent layers 126 may include a material that may convert the other colors of light into white light.

Alternatively, the light source chips 136 may be white LED chips that may emit white light, and in such case, the fluorescent layer 126 may be omitted.

The diffusion layer 124 may be coated on a top surface of the light guide layer 122.

FIG. 2 to FIG. 9 are sectional views illustrating a method of manufacturing a display device according to an exemplary embodiment of the invention.

Figure 2:
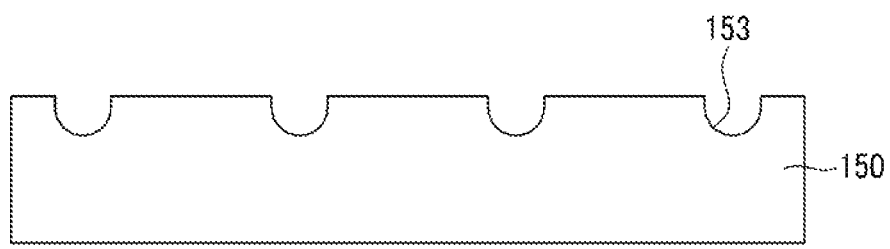
FIG. 2 to FIG. 9 are sectional views illustrating a method of manufacturing a display device according to an exemplary embodiment of the invention.

Referring to FIG. 2, a plurality of depressions 153 having substantially the same shape and arrangement as a plurality of depressions 123 of a light guide layer 122 are formed on a pre-mold plate 150 by using laser beams, for example.

Figure 3:
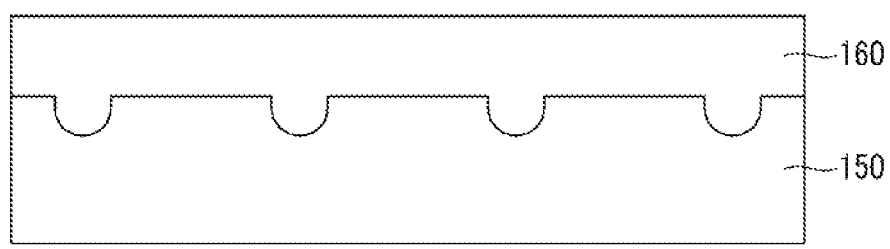
Figure 4:
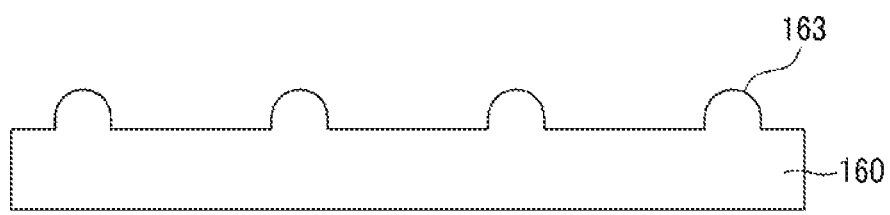

Referring to FIG. 3 and FIG. 4, a material, for example, a ultra-violet (UV) curing resin, is coated on the pre-mold plate 150 and is cured by UV light to form a mold 160 including a plurality of hemispheric protrusions 163 having substantially the same shape as the depressions 153. The mold 160 may be flexible or soft and may be attached to an outer surface of a roll (170 in FIG. 5).

Figure 5:
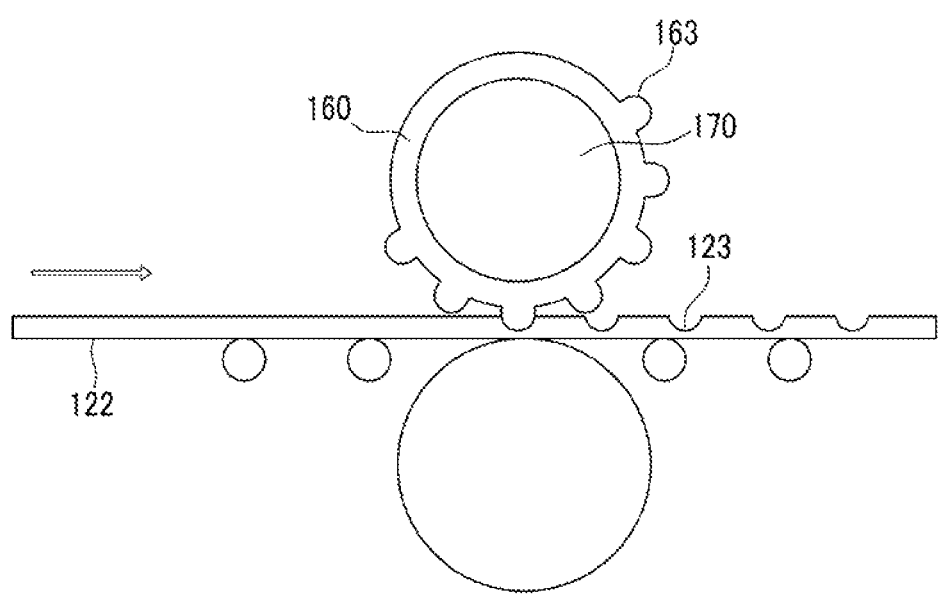

Referring to FIG. 5, the light guide layer 122 is pressed by the roll 170 covered with the mold 160 and thus a plurality of depressions 123 may be formed on a surface of the light guide layer 122.

Figure 6:
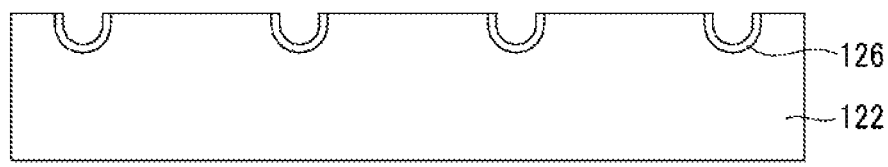
Figure 7:
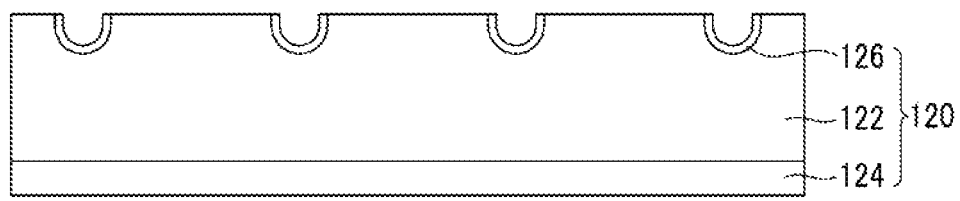

Referring to FIG. 6, fluorescent layers 126 are coated on surfaces of the depressions 123 of the light guide layer 122. Referring to FIG. 7, a diffusion layer 124 is deposited on a surface of the light guide layer 122, which is an opposite surface of the surface where the depressions 123 are formed, thereby forming the light guiding member 120.

Figure 8:
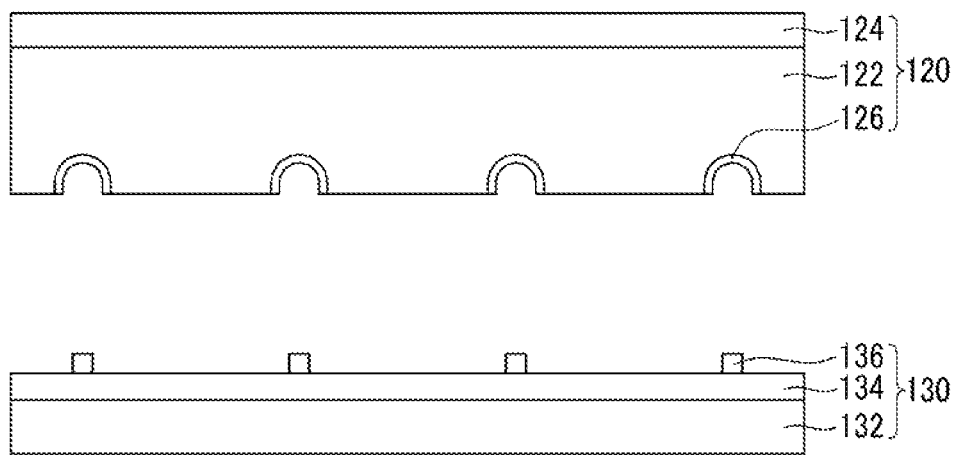

Referring to FIG. 8, the light guiding member 120 is aligned with a light source member 130 such that the depressions 123 of the light guiding member 120 face light source chips 136, respectively, of the light source member 130, and the light guiding member 120 is adhered to the light source member 130.

Figure 9:
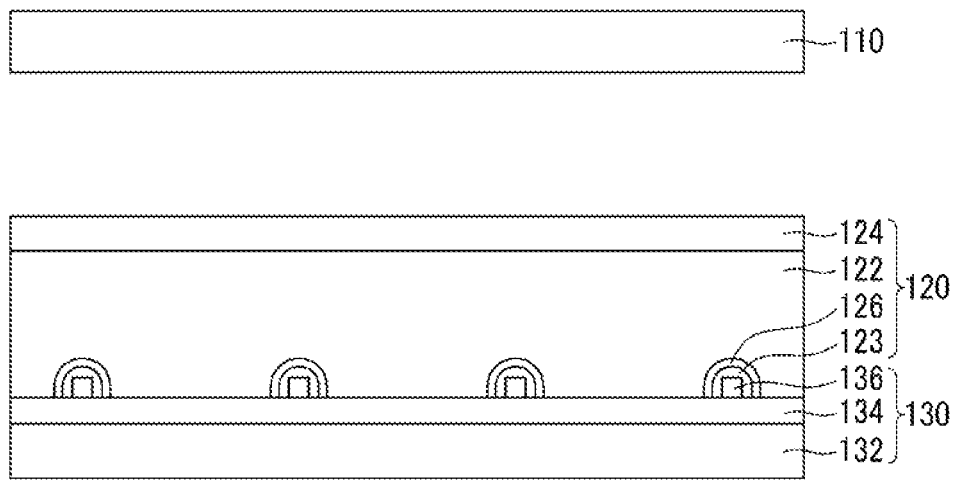

Referring to FIG. 9, a display member 110 is attached to the light guiding member 120, thereby forming a display device according to an exemplary embodiment.

Figure 10:
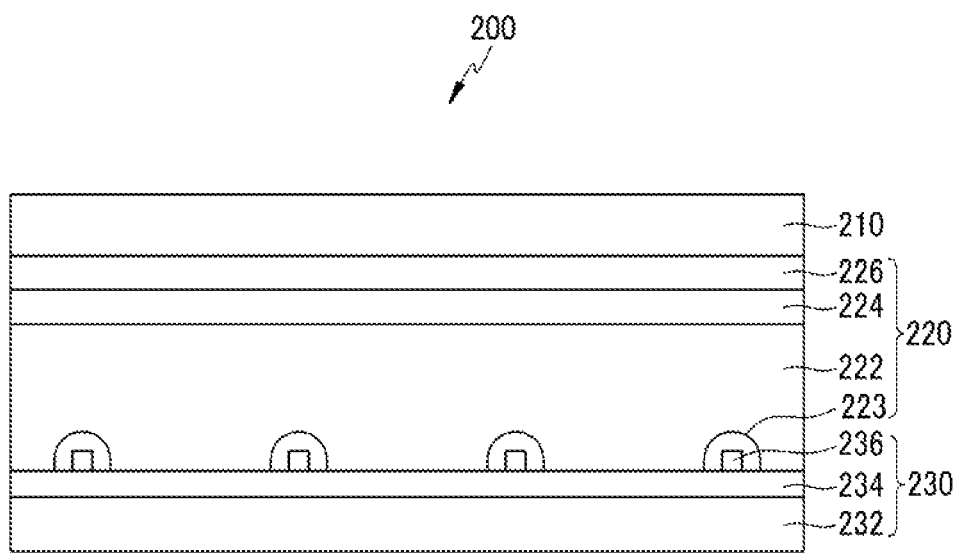
FIG. 10 is a sectional view of a display device according to an exemplary embodiment of the invention.

FIG. 10 is a sectional view of a display device according to an exemplary embodiment of the invention.

Referring to FIG. 10, a display device 200 according to an exemplary embodiment of the invention includes a display member 210, a light guiding member 220, and a light source member 230, which are sequentially stacked like the display device shown in FIG. 1. Each of the display member 210, the light guiding member 220, and the light source member 230 may have a shape of a (flat) panel or a film. The display member 210, the light guiding member 220, and the light source member 230 may be integrated as a single unit. The display member 210 displays images, the light source member 230 produces light, and the light guiding member 220 guides the light from the light source member 230 to the display member 210.

The light guiding member 220 according to an exemplary embodiment includes a light guide layer 222, a diffusion layer 224, and a fluorescent layer 226, which are sequentially disposed on the light source member 230. The light guide layer 222 has a bottom surface with a plurality of depressions 223. The fluorescent layer 226 may include quantum dots (QD).

The light guiding member 220 of the display device 200 includes the fluorescent layer 226 on an upper portion thereof, while the light guiding member 120 of the display device 100 shown in FIG. 1 includes the plurality of fluorescent layers 126 in the depressions 123 on a lower portion thereof.

The display member 210 and the light source member 230 according to an exemplary embodiment may be substantially the same as the display member 110 and the light source member 130, respectively, of the display device 100 shown in FIG. 1. For example, the light source member 230 may include a circuit board 232, a reflective layer 234, and a plurality of light source chips 236, which are sequentially stacked.

The display device 200 according to an exemplary embodiment may be manufactured by a method similar to the method described above in connection with FIG. 2 to FIG. 9. However, the fluorescent layer 226 may be formed on the diffusion layer 224 but not in the light guide layer 222.

Figure 11:
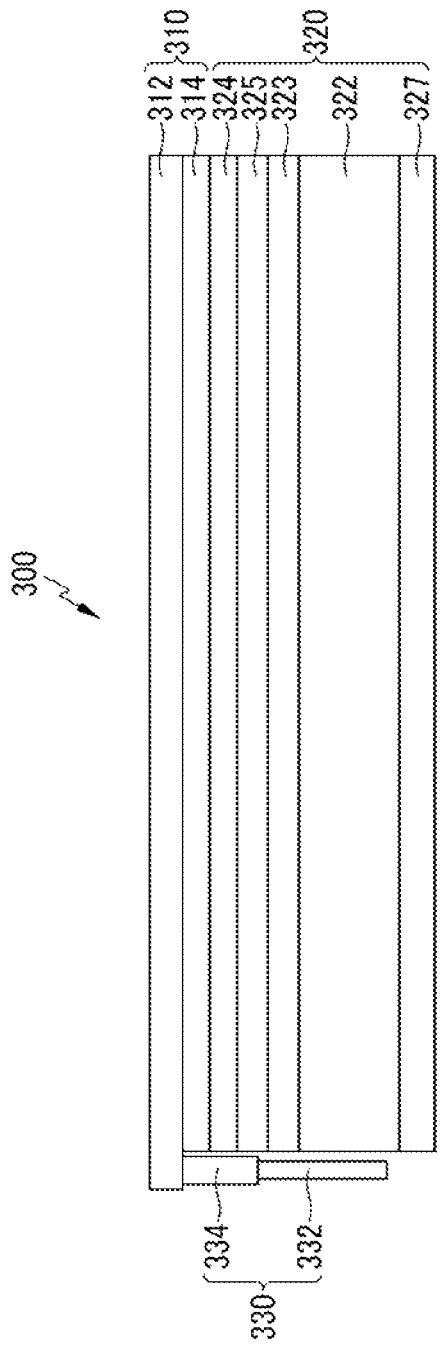
FIG. 11 is a sectional view of a display device according to an exemplary embodiment of the invention.

FIG. 11 is a schematic sectional view of a display device according to an exemplary embodiment of the invention.

Referring to FIG. 11, a display device 300 according to an exemplary embodiment of the invention includes a display member 310, a light guiding member 320, and a light source member 330. The display member 310 displays images, the light source member 330 produces light, and the light guiding member 320 guides the light from the light source member 330 to the display member 310.

The display member 310 includes a first display panel 312 and a second display panel 314 coupled to each other. The display member 310 may further include a liquid crystal layer disposed between the first display panel 312 and the second display panel 314. The two display panels 312 and 314 may have different sizes from each other. For example, the first display panel 312 including pixel electrodes and switching elements may be larger than the second display panel 314 including a common electrode.

The light source member 330 includes a light source chip 332 and a light source support 334. The light source support 334 is attached to a periphery of the first display panel 312 of the display member 310. The light source support 334 may include a plurality of circuit elements electrically connected to the light source chip 332. The light source chip 332 is coupled to the support 334.

The light guiding member 320 according to an exemplary embodiment includes a light guide layer 322, an adhesion layer 323, a reversed prism layer 325, a diffusion layer 324, and a reflection layer 327. The adhesion layer 323, the reversed prism layer 325, and the diffusion layer 324 are sequentially deposited on the light guide layer 322. The reflection layer 327 is disposed under the light guide layer 322.

The adhesion layer 323 may include a material having a low refractive index.

The reversed prism layer 325 includes a plurality of minute prisms positioned upside down.

As described above, the display device according to an exemplary embodiment of the invention includes a display member, a light guiding member, and a light source member that are integrated as a single unit. The display device uses blue light. Accordingly, the display device may be made lightweight. While exemplary embodiments of the present invention have been described, it is to be understood that the invention is not limited to the disclosed embodiments, and that various modifications and variations may be made thereto.

What is claimed is:

1. A display device comprising:
   a display member configured to display images;
   a light source member configured to generate light, wherein the light source member comprises a reflective layer and one or more light source chips disposed on the reflective layer, wherein the one or more light source chips are electrically connected to a circuit board disposed under the reflective layer, and wherein the reflective layer is disposed between the circuit board and the one or more light source chips; and
   a light guiding member disposed between the light source member and the display member and configured to guide the light to the display member,
   wherein the light source member generates blue light, and
   wherein the light guiding member comprises:
      a light guide layer; and
      a fluorescent layer disposed on a top surface or a bottom surface of the light guide layer, the fluorescent layer configured to convert the blue light into white light, wherein the light guide layer has a plurality of depressions disposed on the bottom surface, wherein the bottom surface of the light guide layer is in contact with the reflective layer, and wherein the fluorescent layer is coated on a surface of the depressions and an edge of the fluorescent layer is in contact with the reflective layer.

2. The display device of claim 1, wherein the light guiding member further comprises a diffusion layer disposed on the light guide layer.

3. The display device of claim 2, wherein the fluorescent layer is disposed on a top surface of the diffusion layer.

4. The display device of claim 3, wherein the fluorescent layer comprises a quantum dot.

5. The display device of claim 1, wherein the one or more light source chips are disposed in the depressions.

6. A display device comprising:
   a display member comprising a first display panel and a second display panel combined with the first display panel, wherein the first display panel is larger than the second display panel, wherein a portion of the first display panel overhangs the second display panel, and wherein the display member is configured to display images;
   a light source member configured to generate light, wherein the light source member comprises a support and a light source chip coupled to the support, and wherein the support of the light source member is directly attached to the portion of the first display panel overhanging the second display panel; and
   a light guiding member disposed adjacent to the light source chip of the display member, wherein the light guiding member is configured to guide light to the display member.

7. The display device of claim 6, wherein the light guiding member comprises:
   a light guide layer;
   a diffusion layer disposed on the light guide layer;
   an adhesion layer disposed between the light guide layer and the diffusion layer; and
   a reflection layer disposed under the light guide layer.

8. The display device of claim 7, wherein the light guiding member further comprises a reversed prism layer disposed between the diffusion layer and the adhesion layer.

9. A method of manufacturing a display device, the method comprising:
   forming a plurality of first depressions on a first surface of a light guide layer, wherein the light guide layer includes a second surface disposed opposite to the first surface, and wherein the plurality of first depressions are formed by:

forming a plurality of second depressions having a shape and arrangement substantially the same as the plurality of first depressions of the light guide layer on a pre-mold plate;

coating a light curing resin on the pre-mold plate;

curing the light curing resin to form a mold; and forming the first depressions on the light guide layer using the mold;

forming fluorescent layers on the plurality of first depressions;

depositing a diffusion layer on the second surface of the light guide layer to form a light guiding member, the light guiding member including the light guide layer, the fluorescent layers, and the diffusion layer;

aligning a light source member including a plurality of light source chips with the light guiding member such that the light source chips face the first depressions, respectively;

adhering the light guiding member to the light source member such that the light source chips are received in the first depressions, respectively; and coupling a display member to the light guiding member.

10. The method of claim 9, wherein the mold comprises a flexible material, and wherein the method further comprises:

attaching the mold to an outer surface of a roll, and pressing the light guide layer with the roll.

11. A display device comprising:

a circuit board;

a reflective layer;

a plurality of light source chips electrically connected to the circuit board, wherein the plurality of light source chips are disposed on the reflective layer and are spaced apart from each other at a predetermined distance, and wherein the reflective layer is disposed between the circuit board and the plurality of light source chips;

a light guide disposed on the reflective layer, wherein the light guide includes a plurality of depressions on a bottom surface thereof, and wherein the plurality of depressions are arranged to cover the plurality of light source chips, respectively, wherein the bottom surface of the light guide is in contact with the reflective layer, wherein a fluorescent layer is coated on a surface of the depressions, and wherein an edge of the fluorescent layer is in contact with the reflective layer; and a display panel disposed on the light guide, wherein the circuit board, the reflective layer, the light guide, and the display panel are integrated as a single unit.

12. The display device of claim 1, wherein the display member, the light source member, and the light guiding member are integrated as a single unit.

13. The display device of claim 6, wherein the support of the light source member protrudes in a direction that is substantially perpendicular to an upper surface of the first display panel.

* * * * *